US011642919B2

(12) United States Patent
Yoon et al.

(10) Patent No.: US 11,642,919 B2
(45) Date of Patent: May 9, 2023

(54) VEHICLE WHEEL

(71) Applicants: HYUNDAI MOTOR COMPANY, Seoul (KR); KIA MOTORS CORPORATION, Seoul (KR); DAYOU GLOBAL CO., LTD., Gwangju (KR)

(72) Inventors: Young Sam Yoon, Hwaseong-si (KR); Dong Jin Jang, Siheung-si (KR); Jung Pil Kang, Jeonju-Si (KR); Hoe Gyung Jeong, Jeollabuk-do (KR)

(73) Assignees: HYUNDAI MOTOR COMPANY, Seoul (KR); KIA MOTORS CORPORATION, Seoul (KR); DAYOU GLOBAL CO., LTD., Gwangju (KR)

( * ) Notice: Subject to any disclaimer, the term of this patent is extended or adjusted under 35 U.S.C. 154(b) by 351 days.

(21) Appl. No.: 17/094,005

(22) Filed: Nov. 10, 2020

(65) Prior Publication Data
US 2022/0080784 A1 Mar. 17, 2022

(30) Foreign Application Priority Data
Sep. 11, 2020 (KR) .................. 10-2020-0116881

(51) Int. Cl.
B60B 21/02 (2006.01)
B60C 19/00 (2006.01)
B60B 21/12 (2006.01)

(52) U.S. Cl.
CPC .......... *B60C 19/002* (2013.01); *B60B 21/026* (2013.01); *B60B 21/12* (2013.01); *B60B 2900/131* (2013.01); *B60B 2900/133* (2013.01)

(58) Field of Classification Search
CPC .. B60B 21/12; B60B 2900/133; B60C 19/002
See application file for complete search history.

(56) References Cited

U.S. PATENT DOCUMENTS
2020/0316988 A1  10/2020  Seung et al.

FOREIGN PATENT DOCUMENTS

| JP | 2010095103 A | * | 4/2010 | |
|---|---|---|---|---|
| KR | 2018013177 A | * | 2/2018 | ............ B60B 21/12 |
| KR | 2018045602 A | * | 5/2018 | ............ B60B 21/12 |
| KR | 10-1893350 B1 | | 8/2018 | |
| KR | 1893350 B1 | * | 8/2018 | ........... B60B 21/026 |

* cited by examiner

*Primary Examiner* — Scott A Browne
(74) *Attorney, Agent, or Firm* — Morgan, Lewis & Bockius LLP

(57) ABSTRACT

A wheel structure for a vehicle includes: a rim, and a resonator including a plurality of resonance tubes attached along an outer peripheral surface of the rim. The plurality of resonance tubes are spaced apart from each other and connected along the outer peripheral surface of the rim by a plurality of strips, and an end of each of the strips is coupled to a corresponding end of each of the resonance tubes.

15 Claims, 11 Drawing Sheets

VEHICLE WHEEL

CROSS-REFERENCE TO RELATED APPLICATION

This application claims priority to and the benefit of Korean Patent Application No. 10-2020-0116881 filed in the Korean Intellectual Property Office on Sep. 11, 2020, the entire contents of which are incorporated herein by reference.

TECHNICAL FIELD

The present disclosure relates to a vehicle wheel, and more particularly, to a vehicle wheel, in which a resonator may be rigidly and conveniently mounted on an outer peripheral surface of a rim.

BACKGROUND ART

A vehicle wheel includes a rim on which a tire is mounted, and a disc coupled to the rim by welding. Since continuous friction occurs with a road surface while a vehicle travels, a sidewall of the tire vibrates due to vibration of the tire caused by the friction with the road surface while the vehicle travels. The vibration of the sidewall causes resonance in an internal space of the tire. In addition, the resonance is reflected between an inner surface and the rim of the tire, which causes resonance sound in a frequency band of 200 Hz to 300 Hz. The sound having a sharp peak is transmitted into an occupant compartment, which causes a driver to feel unpleasant due to noise and causes a deterioration in ride quality due to persistent noise. Accordingly, a vehicle wheel equipped with a resonator for reducing the resonance sound has been released, and the resonator is attached to an outer peripheral surface of a rim of the vehicle wheel.

In the related art, the resonator is mounted on the outer peripheral surface of the rim of the vehicle wheel. Two mounting walls are provided on the outer peripheral surface of the rim, the two mounting walls are spaced apart from each other in a width direction of the rim, a distance between the two mounting walls corresponds to a width of the resonator, and each of the mounting walls has a fitting groove into which each side edge of the resonator is fitted. As the two side edges of the resonator are fitted into the fitting grooves of the two mounting walls, respectively, the resonator is mounted on the outer peripheral surface of the rim.

Each of the side edges of the resonator has a relatively small thickness, and thus stress may be concentrated on each of the side edges of the resonator. For this reason, mounting rigidity of the resonator may deteriorate, and as a result, the resonator may be withdrawn from the outer peripheral surface of the rim of the vehicle wheel. In addition, it is inconvenient to mount the resonator because the two side edges of the resonator are mounted on the two mounting walls.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a vehicle wheel, in which a resonator may be rigidly and conveniently mounted on an outer peripheral surface of a rim.

In order to achieve the above-mentioned object, a wheel structure for a vehicle according to an exemplary embodiment of the present disclosure may include: a rim, and a resonator including a plurality of resonance tubes attached along an outer peripheral surface of the rim. The plurality of resonance tubes may be spaced apart from each other and connected along the outer peripheral surface of the rim by a plurality of strips, and an end of each of the strips may be coupled to a corresponding end of each of the resonance tubes.

Each of the strips may have an embedded protrusion protruding toward the corresponding resonance tube from the end of the strip, the resonance tube may have an encapsulation wall configured to surround the embedded protrusion, and the encapsulation wall may have a hole in which the embedded protrusion is embedded.

The hole may have an inner surface and an inner diameter that match an outer surface and an outer diameter of the embedded protrusion.

The strip may have a head portion positioned at a free end of the embedded protrusion, and a bottom surface of the head portion may have a diameter larger than a diameter of the embedded protrusion.

The head portion may be positioned in a cavity of the resonance tube.

The resonance tube may be configured to be snap-fitted with the outer peripheral surface of the rim.

The resonance tube may have a fitting groove extending along an inner peripheral wall of the resonance tube, and the rim may have a fitting protrusion fitted with the fitting groove.

The fitting groove may be recessed from the inner peripheral wall of the resonance tube toward an outer peripheral wall of the resonance tube.

The fitting groove may be separated by a cavity well from a cavity of the resonance tube, and the cavity well may be recessed from the inner peripheral wall of the resonance tube toward the outer peripheral wall of the resonance tube.

The resonance tube may include first and second retention lips facing the fitting groove, and the first and second retention lips may face each other based on a center of the fitting groove. The fitting protrusion may include an extension rib protruding radially outward from the outer peripheral surface of the rim, and first and second retention protrusions extending from the extension rib so as to be opposite to each other. The first retention protrusion may be configured to be coupled to the first retention lip, and the second retention protrusion may be configured to be coupled to the second retention lip.

The resonance tube may include first and second contact protrusions configured to overlap and come into contact with the outer peripheral surface of the rim, and the first contact protrusion may be spaced apart from the second contact protrusion in a width direction of the resonance tube.

The rim may include a first stopper configured to support the first contact protrusion, and a second stopper configured to support the second contact protrusion.

The resonance tube may include a retention tab extending along a first edge, and a fitting protrusion extending along a second edge, the first edge may be an edge directed toward an outboard side of the vehicle, the second edge may be an edge directed toward an inboard side of the vehicle, and the rim may include a coupling protrusion to which the retention tab is coupled, and a coupling groove to which the fitting protrusion is coupled.

The retention tab may protrude radially inward from the first edge of the resonance tube, and the coupling protrusion may protrude radially outward from the outer peripheral surface of the rim.

The fitting protrusion may horizontally protrude from the second edge of the resonance tube toward the inboard side of the vehicle.

The plurality of resonance tubes may be configured to be attached to the outer peripheral surface of the rim by a fastening strap, and the fastening strap may be tightened around the plurality of resonance tubes and the plurality of strips by a strap fastener, such that the plurality of resonance tubes and the plurality of strips may be fixed to the outer peripheral surface of the rim.

The resonance tube may have a coupling groove extending along an outer peripheral wall thereof, the coupling groove may be recessed from the outer peripheral wall of the resonance tube toward an inner peripheral wall of the resonance tube, and the fastening strap may be inserted into the coupling groove of the resonance tube.

According to the present disclosure, the resonator is rigidly mounted on the outer peripheral surface of the rim, such that it is possible to reduce vibration and noise that occur due to a flow of air in the tire while the vehicle travels.

According to the present disclosure, the fitting groove of the resonance tube is coupled to the fitting protrusion of the rim, and the first and second contact protrusions of the resonance tube overlap and come into contact with the outer peripheral surface of the rim, such that it is possible to prevent the resonance tube and the rim from being separated from each other or prevent a gap from being formed between the resonance tube and the rim, thereby minimizing the occurrence of vibration.

According to the present disclosure, the position at which the resonance tube is mounted may be stably restricted in the well of the rim, such that it is possible to assuredly prevent the resonance tube from being damaged by a tire assembling jig when the tire is assembled to the rim.

DETAILED DESCRIPTION

Figure 1:
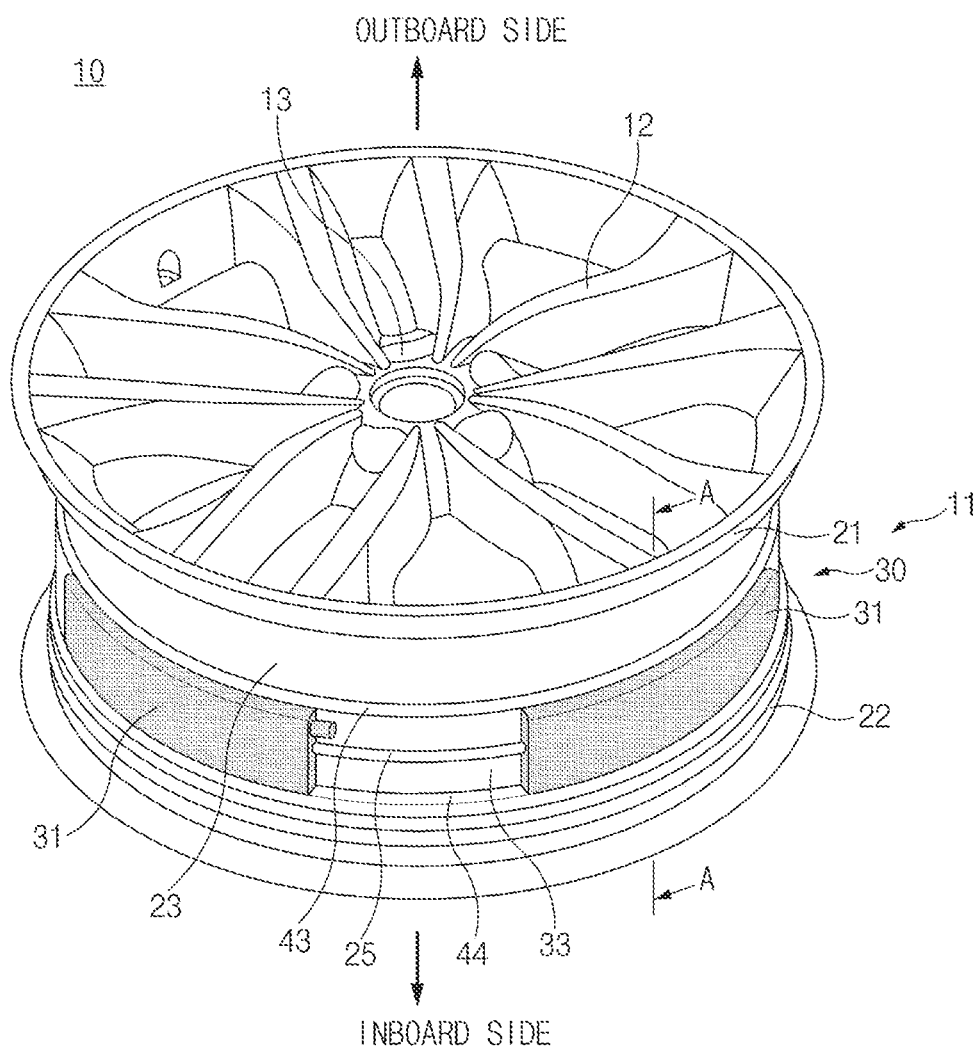
FIG. 1 is a perspective view illustrating a vehicle wheel according to an exemplary embodiment of the present disclosure.

Hereinafter, some exemplary embodiments of the present disclosure will be described in detail with reference to the illustrative drawings. In giving reference numerals to constituent elements of the respective drawings, it should be noted that the same constituent elements will be designated by the same reference numerals, if possible, even though the constituent elements are illustrated in different drawings. Further, in the following description of the exemplary embodiments of the present disclosure, a detailed description of publicly known configurations or functions incorporated herein will be omitted when it is determined that the detailed description obscures the subject matters of the exemplary embodiments of the present disclosure.

In addition, the terms first, second, A, B, (a), and (b) may be used to describe constituent elements of the exemplary embodiments of the present disclosure. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present application.

In the present specification, the term "radially inward" refers to a direction toward a center of a wheel or a rim, and the term "radially outward" refers to a direction away from the center of the wheel or the rim. In addition, the term "inboard side" refers to a direction toward an inboard space of the vehicle, and the term "outboard side" refers to a direction toward a space outside the vehicle.

Figure 2:
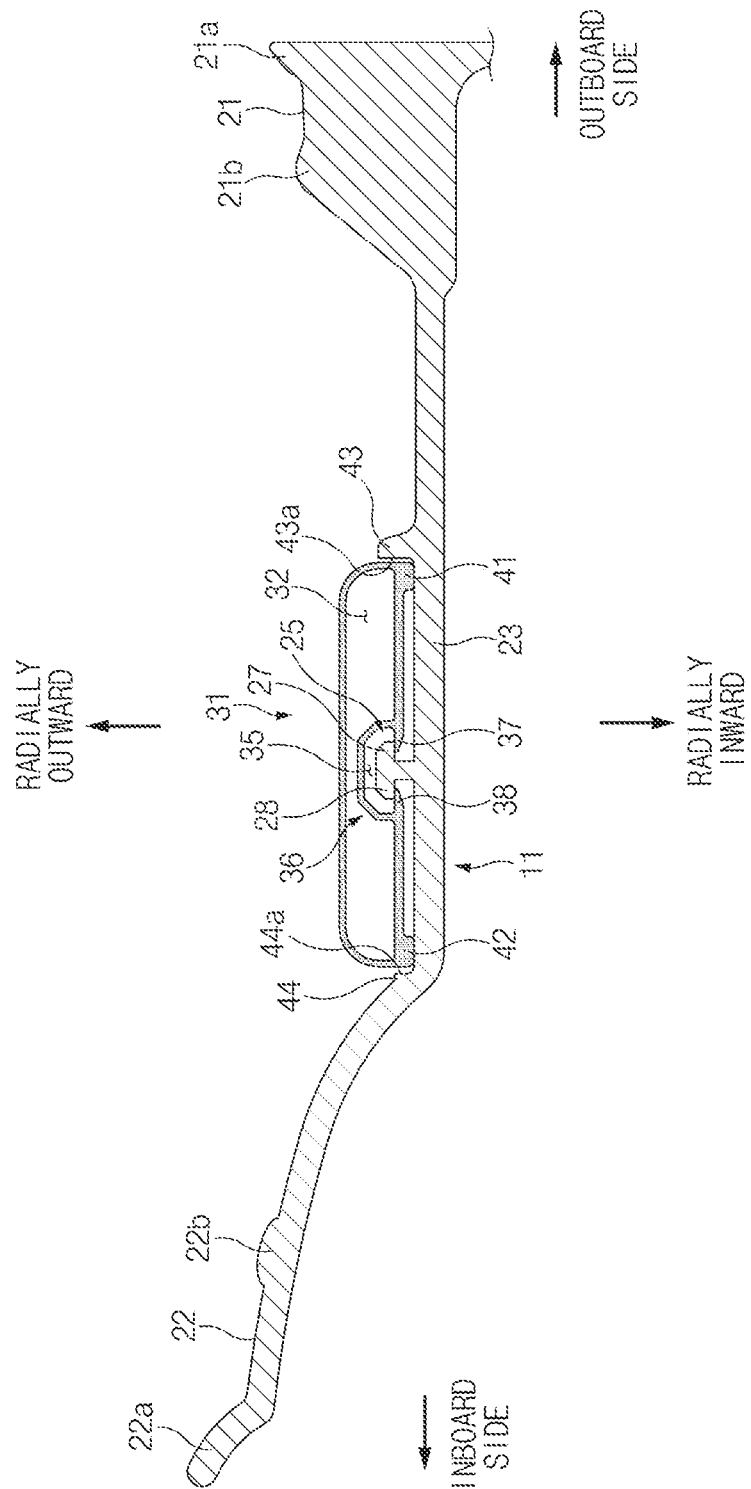
FIG. 2 is a cross-sectional view taken along line A-A in FIG. 1.
Figure 3:
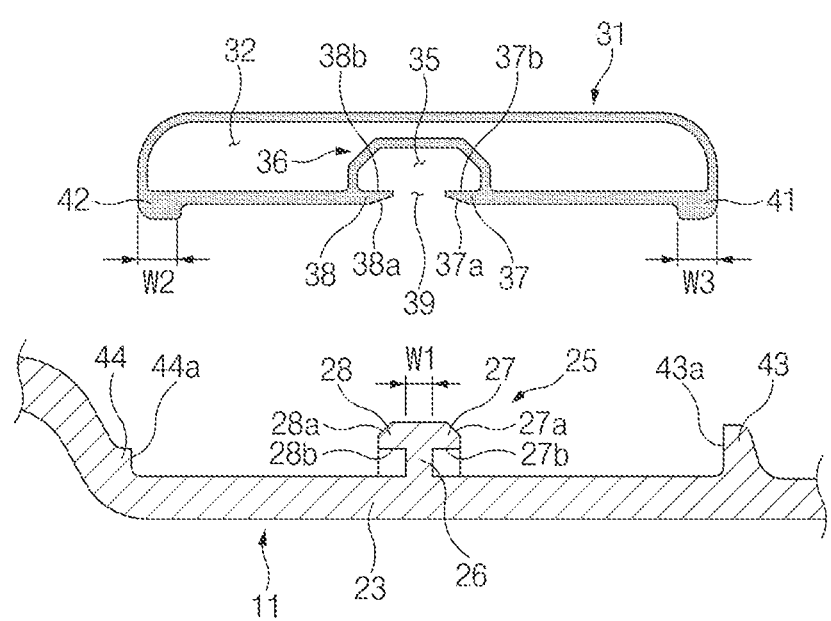
FIG. 3 is a view illustrating a state in which a resonance tube illustrated in FIG. 2 is separated from an outer peripheral surface of a rim.

Referring to FIGS. 1 to 3, a vehicle wheel 10 according to an exemplary embodiment of the present disclosure may include a rim 11 on which a tire (not illustrated) is mounted, and a resonator 30 mounted on an outer peripheral wall of the rim 11.

As an example, as illustrated in FIG. 1, a hub 13 may be positioned at a center of the rim 11, and a plurality of spokes 12 may extend between the rim 11 and the hub 13. As another example, a disc may be coupled to an inner peripheral wall of the rim 11 by welding or the like.

Referring to FIG. 2, the rim 11 may include an outboard bead seat 21, an inboard bead seat 22 spaced apart from the outboard bead seat 21 in a width direction of the rim 11, and a well (or drop center) 23 positioned between the outboard bead seat 21 and the inboard bead seat 22. The well 23 may be recessed toward the center of the rim 11, an outboard flange 21a may extend radially outward from the outboard bead seat 21, an outboard safety hump 21b may be positioned between the outboard bead seat 21 and the well 23, an inboard flange 22a may extend radially outward from the inboard bead seat 22, and an outboard safety hump 22b may be positioned between the outboard bead seat 22 and the well 23.

The outboard bead seat 21 may be directed toward the outboard side of the vehicle, and the inboard bead seat 22 may be directed toward the inboard side of the vehicle. An outboard bead of the tire may be attached to the outboard bead seat 21 of the rim 11, and an inboard bead of the tire may be attached to the inboard bead seat 22 of the rim 11, such that the tire may be mounted on an outer peripheral surface of the rim 11.

The resonator 30 may be attached to the well 23 of the rim 11. The resonator 30 may include a plurality of resonance tubes 31 attached to the outer peripheral surface of the rim 11. The plurality of resonance tubes 31 is annularly connected by a plurality of strips 33, such that the plurality of resonance tubes 31 and the plurality of strips 33 may be continuously connected along a circumference of the rim 11.

Referring to FIG. 1, the two adjacent resonance tubes 31 are connected by each of the strips 33, such that the plurality of resonance tubes 31 and the plurality of strips 33 may be arranged alternately along the outer peripheral surface of the rim 11. Each of the resonance tubes 31 and each of the strips 33 may have a curved shape that matches a curvature of the rim 11. Therefore, each of the resonance tubes 31 and each of the strips 33 may be in tight contact with the outer peripheral surface of the rim 11.

Referring to FIGS. 2 to 6, each of the resonance tubes 31 may include a cavity 32 formed in the resonance tube 31, and one or more vent holes 45a that communicate with the cavity 32.

Figure 4:
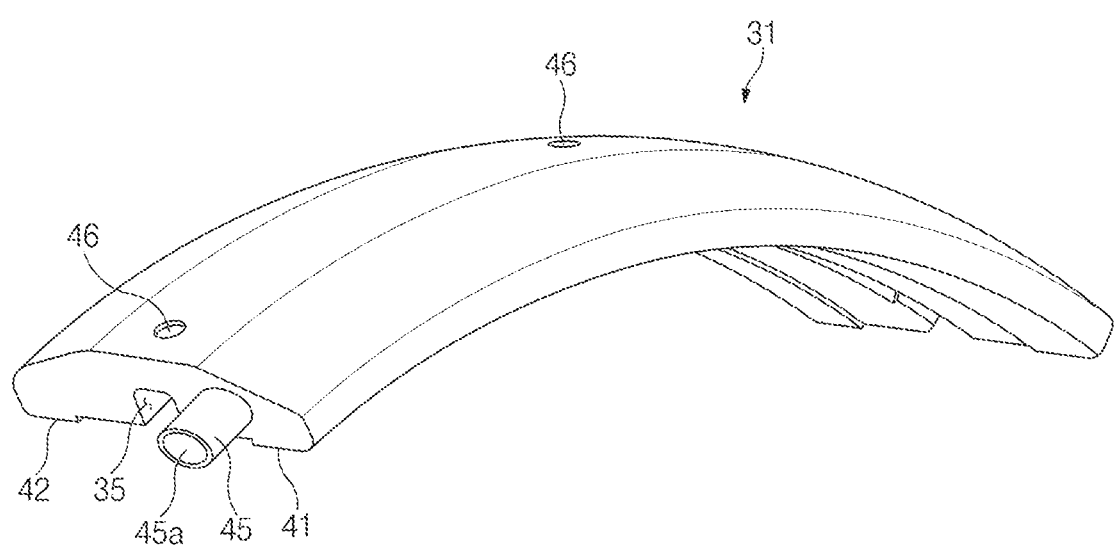
FIG. 4 is a perspective view illustrating the resonance tube to be mounted on the vehicle wheel according to the exemplary embodiment of the present disclosure.
Figure 5:
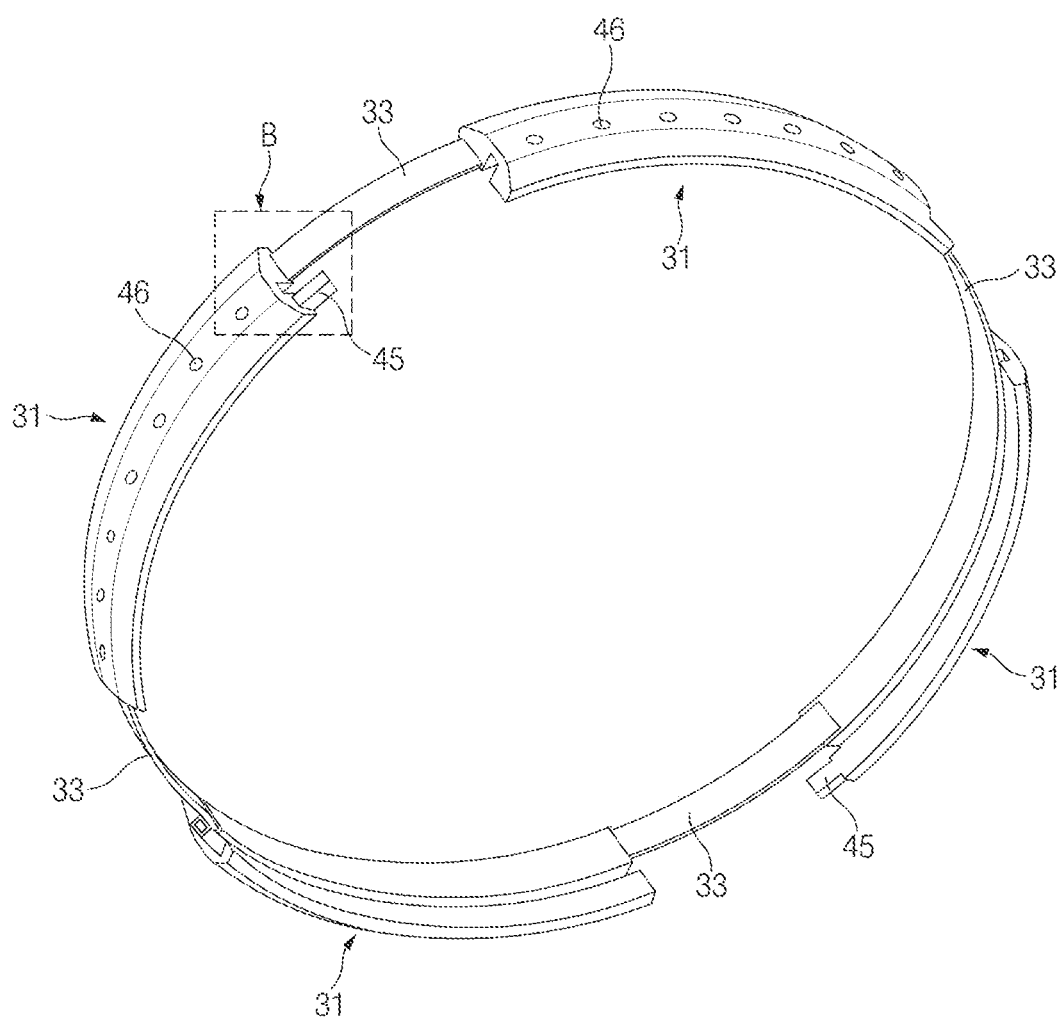
FIG. 5 is a perspective view illustrating a resonator for the vehicle wheel according to the exemplary embodiment of the present disclosure.
Figure 6:
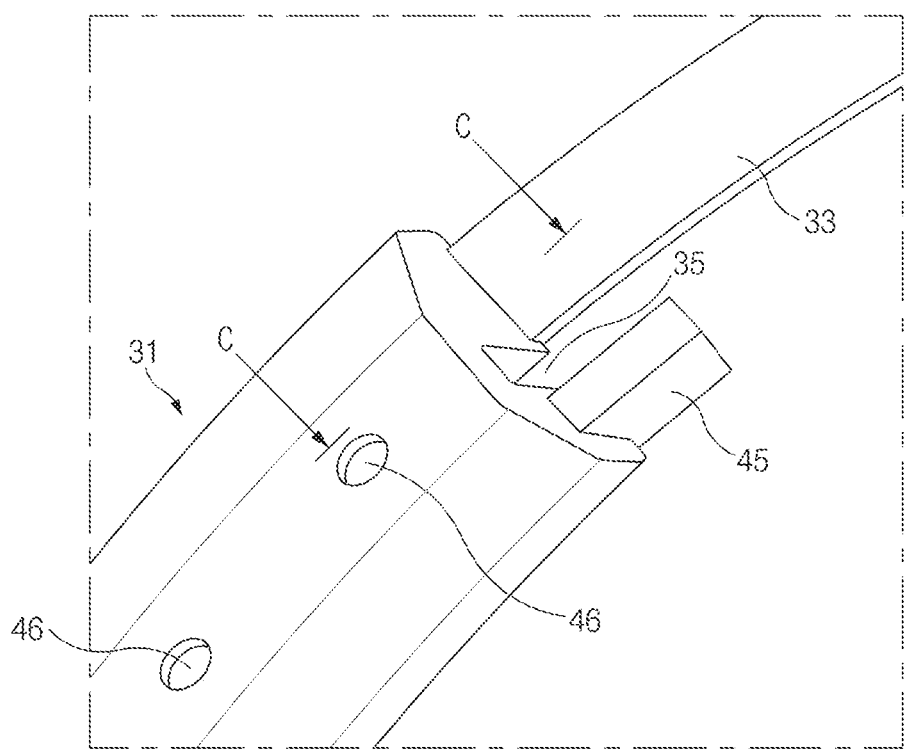
FIG. 6 is an enlarged view of a part indicated by the arrow B in FIG. 5.

Referring to FIGS. 4 to 6, each of the resonance tubes 31 may be a Helmholtz resonator having a vent neck 45 extending from at least one end thereof. The vent neck 45 may have the vent hole 45a that communicates with the cavity 32 of the resonance tube 31, and the cavity 32 of each of the resonance tubes 31 may communicate, through the vent hole 45a, with a cavity defined by an inner peripheral surface of a tire (not illustrated) and the outer peripheral surface of the rim 11. Each of the resonance tubes 31 may have a plurality of beads 46 formed on an outer peripheral wall and/or an inner peripheral wall thereof, and the plurality of beads 46 may be spaced apart from one another at predetermined intervals in a longitudinal direction of the resonance tube 31. The rigidity of the resonance tube 31 may be enhanced by the plurality of beads 46, such that the cavity 32 of the resonance tube 31 may be constantly maintained. Referring to FIG. 6, the bead 46 may be a recessed bead recessed toward the cavity 32 of the resonance tube 31.

The resonance tube 31 may be configured to be coupled to the outer peripheral surface of the rim 11 (particularly, an outer peripheral surface of the well 23 of the rim 11) in a snap-fit manner. The strip 33 may be configured to connect ends of the two resonance tubes 31 adjacent to each other along a circumference of the rim 11. In particular, an end of the strip 33 may be integrally coupled to the end of the resonance tube 31.

Referring to FIGS. 2 and 3, the resonance tube 31 may have a fitting groove 35 extending along the inner peripheral wall of the resonance tube 31, and the rim 11 may have a fitting protrusion 25 protruding outward in a radial direction of the rim 11 from the outer peripheral surface of the rim 11. The fitting groove 35 of the resonance tube 31 may be snap-fitted with the fitting protrusion 25 of the rim 11.

Referring to FIGS. 2 to 4, the fitting groove 35 may be recessed from the inner peripheral wall of the resonance tube 31 toward the outer peripheral wall of the resonance tube 31. Therefore, when the fitting protrusion 25 of the rim 11 is fitted with the fitting groove 35, the inner peripheral wall of the resonance tube 31 may be close to or in close contact with the outer peripheral wall of the rim 11. The fitting groove 35 may be defined by a cavity well 36, and the cavity well 36 may be recessed from the inner peripheral wall of the resonance tube 31 toward the outer peripheral wall of the resonance tube 31. In particular, the cavity well 36 divides the fitting groove 35 and the cavity 32 of the resonance tube 31, such that the fitting groove 35 may be physically and fluidly separated from the resonance tube 31.

The resonance tube 31 may include first and second retention lips 37 and 38 that face the fitting groove 35. The first retention lip 37 may extend from the cavity well 36 toward the inboard side of the vehicle, and the second retention lip 38 may extend from the cavity well 36 toward the outboard side of the vehicle. The first retention lip 37 may be adjacent to the outboard side of the vehicle, and the second retention lip 38 may be adjacent to the inboard side of the vehicle. The first and second retention lips 37 and 38 may be flush with the inner peripheral wall of the resonance tube 31.

The first and second retention lips 37 and 38 may face each other based on a center of the fitting groove 35. Each of the retention lips 37 and 38 may protrude toward the center of the fitting groove 35, and each of the retention lips 37 and 38 may extend along the inner peripheral wall of the resonance tube 31. The first retention lip 37 and the second retention lip 38 are spaced apart from each other with a predetermined gap, such that the fitting opening 39 may be defined between the first retention lip 37 and the second retention lip 38. The first retention lip 37 may have a tapered surface 37a and a coupling surface 37b. The tapered surface 37a of the first retention lip 37 may have a predetermined inclination angle in order to allow the first retention lip 37 to be bent toward the outside of the rim 11 when the fitting protrusion 25 is inserted into the fitting groove 35. The coupling surface 37b of the first retention lip 37 may be flat.

The second retention lip 38 may have a tapered surface 38a and a coupling surface 38b. The tapered surface 38a of the second retention lip 38 may have a predetermined inclination angle to allow the second retention lip 38 to be bent toward the outside of the rim 11 when the fitting protrusion 25 is inserted into the fitting groove 35. The coupling surface 38b of the second retention lip 38 may be flat.

Referring to FIGS. 2 and 3, the fitting protrusion 25 may extend along the outer peripheral surface of the rim 11. The fitting protrusion 25 includes an extension rib 26 protruding radially outward from the outer peripheral surface of the rim 11, and first and second retention protrusions 27 and 28 extending from the extension rib 26 so as to be opposite to each other, such that the fitting protrusion 25 may have a "T"-shaped cross-section. The first retention protrusion 27 may extend from the extension rib 26 toward the outboard side of the vehicle, and the second retention protrusion 28 may extend from the extension rib 26 toward the inboard side of the vehicle. The extension rib 26 may be orthogonal to the retention protrusions 27 and 28 and the retention lips 37 and 38.

The first retention protrusion 27 may correspond to the first retention lip 37, and the second retention protrusion 28 may correspond to the second retention lip 38. The first retention protrusion 27 may have a tapered surface 27a and a coupling surface 27b, and the tapered surface 27a of the first retention protrusion 27 may have an angle corresponding to the angle of the tapered surface 37a of the first retention lip 37. The coupling surface 27b of the first retention protrusion 27 may be flat. The second retention protrusion 28 may have a tapered surface 28a and a coupling surface 28*b*, and the tapered surface 28*a* of the second retention protrusion 28 may have an angle corresponding to the angle of the tapered surface 38*a* of the second retention lip 38. The coupling surface 28*b* of the second retention protrusion 28 may be flat.

When the fitting protrusion 25 is being inserted into the fitting groove 35, the tapered surface 27*a* of the first retention protrusion 27 may slide along the tapered surface 37*a* of the first retention lip 37, and the tapered surface 28*a* of the second retention protrusion 28 may slide along the tapered surface 38*a* of the second retention lip 38. When the fitting protrusion 25 is completely inserted into the fitting groove 35, the coupling surface 27*b* of the first retention protrusion 27 may be coupled to and supported by the coupling surface 37*b* of the first retention lip 37, and the coupling surface 28*b* of the second retention protrusion 28 may be coupled to and supported by the coupling surface 38*b* of the second retention lip 38. As the fitting protrusion 25 is coupled to the fitting groove 35 as described above, the resonance tube 31 may be rigidly mounted on the outer peripheral surface of the rim 11.

In addition, the resonance tube 31 may include first and second contact protrusions 41 and 42 configured to come into direct contact with the outer peripheral surface of the well 23 of the rim 11. The first contact protrusion 41 may be spaced apart from the second contact protrusion 42 along a width of the resonance tube 31. The first contact protrusion 41 may protrude toward the rim 11 from a first edge of the resonance tube 31, and the first contact protrusion 41 may overlap and come into contact with the outer peripheral surface of the well 23 of the rim 11. The first edge of the resonance tube 31 may be an edge directed toward the outboard side of the vehicle. The second contact protrusion 42 may protrude toward the rim 11 from a second edge of the resonance tube 31, and the second contact protrusion 42 may overlap and come into contact with the outer peripheral surface of the well 23 of the rim 11. The second edge of the resonance tube 31 may be an edge directed toward the inboard side of the vehicle. A width w2 of the first contact protrusion 41 and a width w3 of the second contact protrusion 42 may be relatively larger than a width w1 of the extension rib 26 of the fitting protrusion 25, such that relatively large areas of the first and second contact protrusions 41 and 42 may come into contact with the outer peripheral surface of the well 23.

The rim 11 may include a first stopper 43 configured to come into contact with the first edge of the resonance tube 31, and a second stopper 44 configured to come into contact with the second edge of the resonance tube 31. The first stopper 43 may come into contact with the first edge and the first contact protrusion 41 of the resonance tube 31, and the second stopper 44 may come into contact with the second edge and the second contact protrusion 42 of the resonance tube 31. Therefore, the position at which the resonance tube 31 is mounted may be stably restricted in the well 23 of the rim 11 by the first stopper 43 and the second stopper 44.

The first stopper 43 may protrude outward in the radial direction of the rim 11 from the center of the well 23, and the first stopper 43 and the second stopper 44 may prevent the resonance tube 31 from being withdrawn from the well 23, such that the position at which the resonance tube 31 is mounted may be stably restricted in the well 23. Since the resonance tube 31 is restricted in the well 23 as described above, it is possible to assuredly prevent the resonance tube 31 from being damaged by a tire assembling jig when the tire is assembled to the rim 11.

Figure 7:
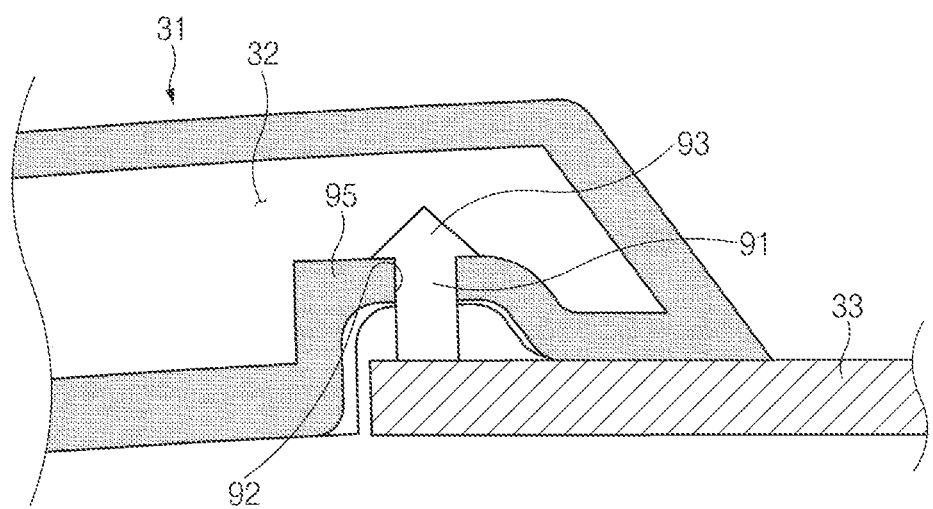
FIG. 7 is a cross-sectional view taken along line C-C in FIG. 6.

Referring to FIGS. 5 to 7, the strip 33 may be configured to physically connect the two adjacent resonance tubes 31. Each end of the strip 33 may be directly coupled to each corresponding end of the resonance tube 31. The strip 33 may have an embedded protrusion 91 embedded in the resonance tube 31, and the resonance tube 31 may have an encapsulation wall 95 that surrounds the embedded protrusion 91. The embedded protrusion 91 may protrude toward the cavity 32 of the resonance tube 31 from each of the ends of the strip 33, and the encapsulation wall 95 may be formed at each of the ends of the resonance tube 31. In particular, the encapsulation wall 95 may be configured to be recessed from the inner peripheral wall of the resonance tube 31 toward the outer peripheral wall of the resonance tube 31. Therefore, the encapsulation wall 95 of the resonance tube 31 may overlap each of the ends of the strip 33, such that the embedded protrusion 91 of the strip 33 may be hidden by the outer peripheral wall of the resonance tube 31. The encapsulation wall 95 may have a hole 92 into which the embedded protrusion 91 is inserted, the embedded protrusion 91 may extend through the hole 92. A head portion 93 may be formed at a free end of the embedded protrusion 91. The head portion 93 may have a conical shape. A bottom surface of the head portion 93 may have a diameter larger than an outer diameter of the embedded protrusion 91 and an inner diameter of the hole 92. The head portion 93 may be positioned in the cavity 32 of the resonance tube 31. The embedded protrusion 91 of the strip 33 may be embedded in the hole 92 of the resonance tube 31 by insert molding or the like, and the bottom surface of the head portion 93 may be supported on the resonance tube 31, such that the embedded protrusion 91 of the strip 33 may be very rigidly coupled to the resonance tube 31. For example, the resonance tube 31 may be formed by blow molding, such that the cavity 32 of the resonance tube 31 may be precisely formed. During a process of forming the resonance tube 31 by blow molding, a molten material, which constitutes the resonance tube 31, is cured while surrounding the embedded protrusion 91 of the strip 33 in a state in which the embedded protrusion 91 of the strip 33 is positioned in a blow mold for the resonance tube 31, such that the embedded protrusion 91 of the strip 33 may be integrally coupled to the resonance tube 31. In this case, each of the resonance tubes 31 is formed by blow molding, such that each of the resonance tubes 31 may have the cavity 32 defined therein.

According to the exemplary embodiment, the embedded protrusion 91 may have a cylindrical shape having a predetermined outer diameter, and the hole 92 may have an inner surface and an inner diameter that match an outer surface and an outer diameter of the embedded protrusion 91. Therefore, resistance to shearing force applied to the embedded protrusion 91 may be enhanced, such that the embedded protrusion 91 and the hole 92 may greatly increase fastening force between the resonance tube 31 and the strip 33.

Figure 8:
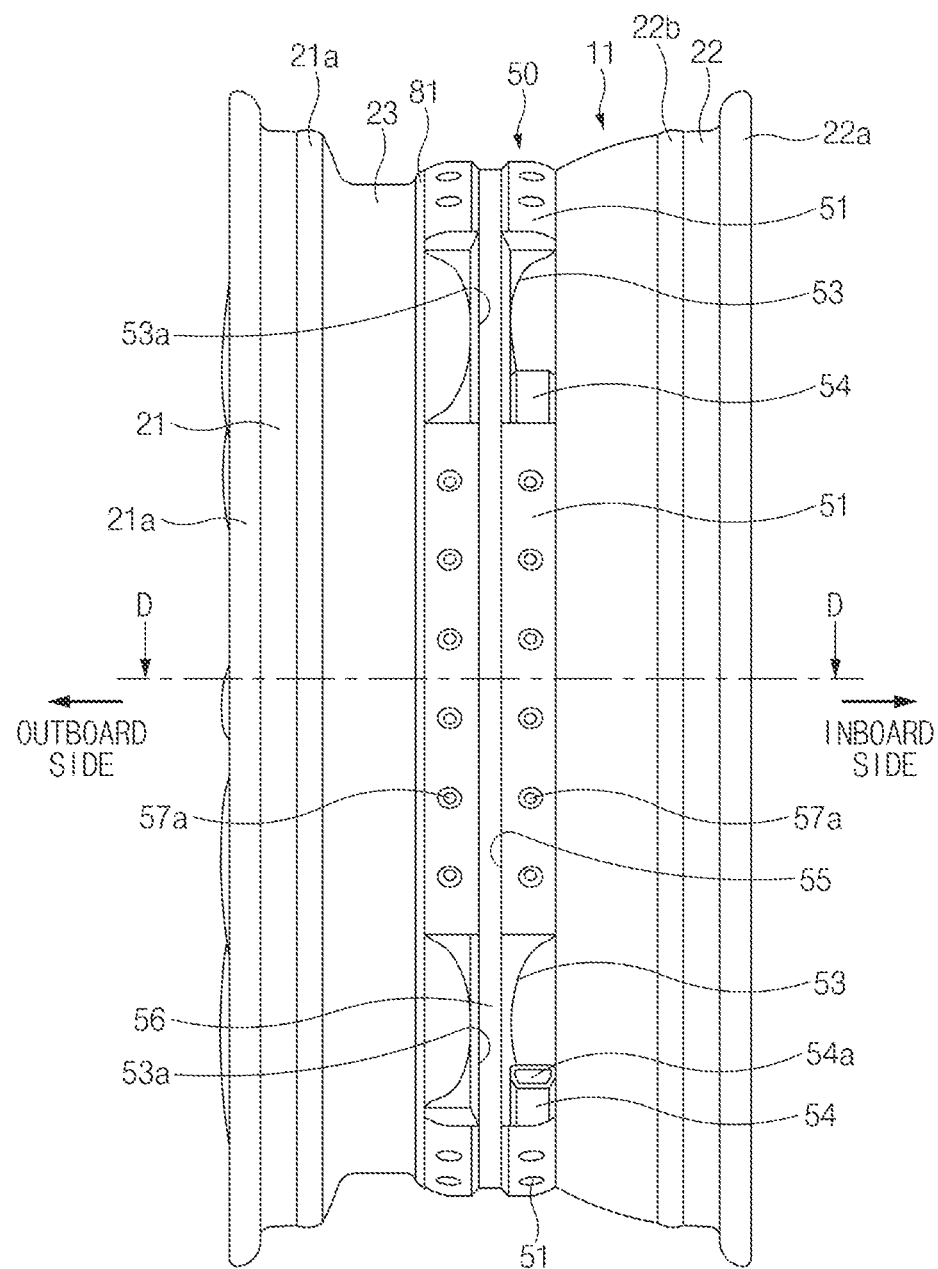
FIG. 8 is a top plan view illustrating a vehicle wheel according to another exemplary embodiment of the present disclosure.
Figure 9:
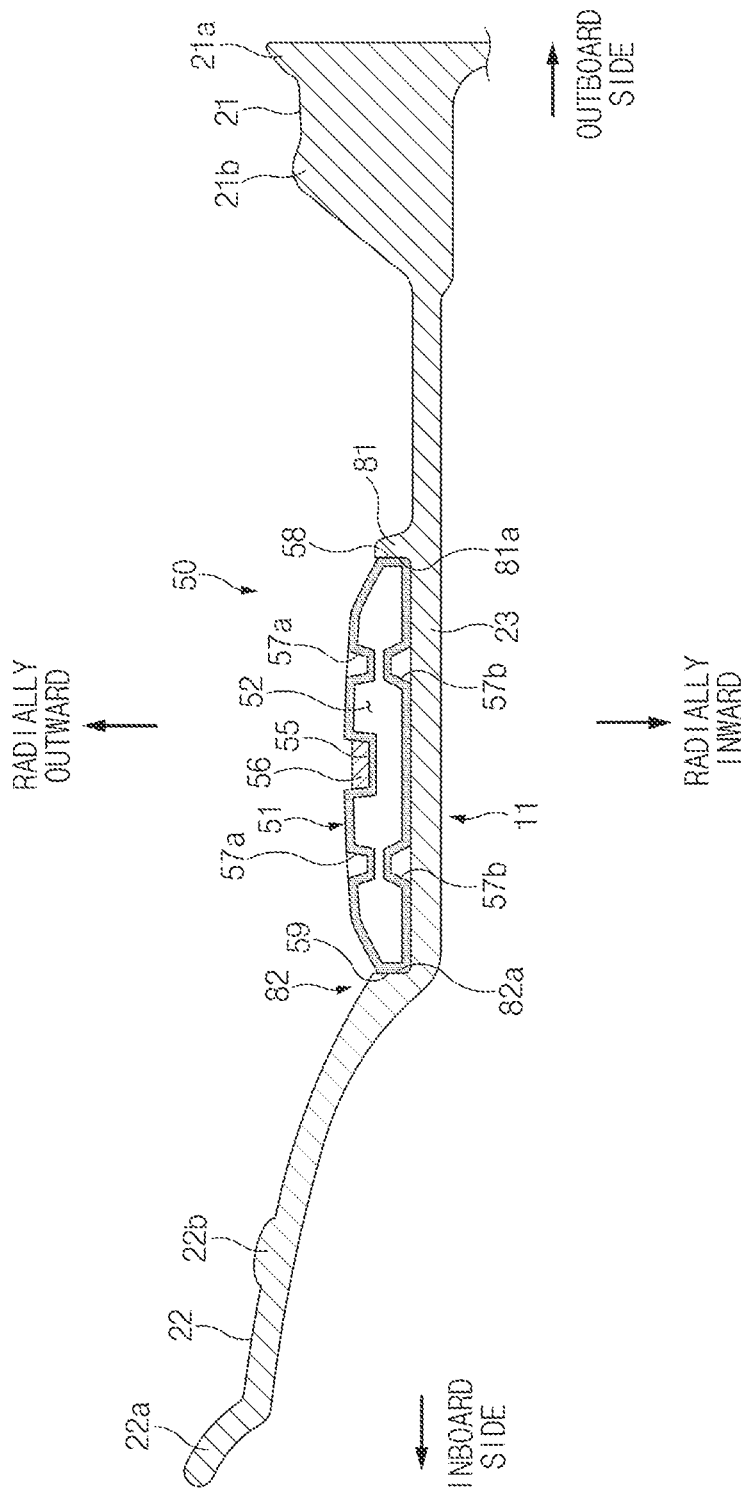
FIG. 9 is a cross-sectional view taken along line D-D in FIG. 8.
Figure 10:
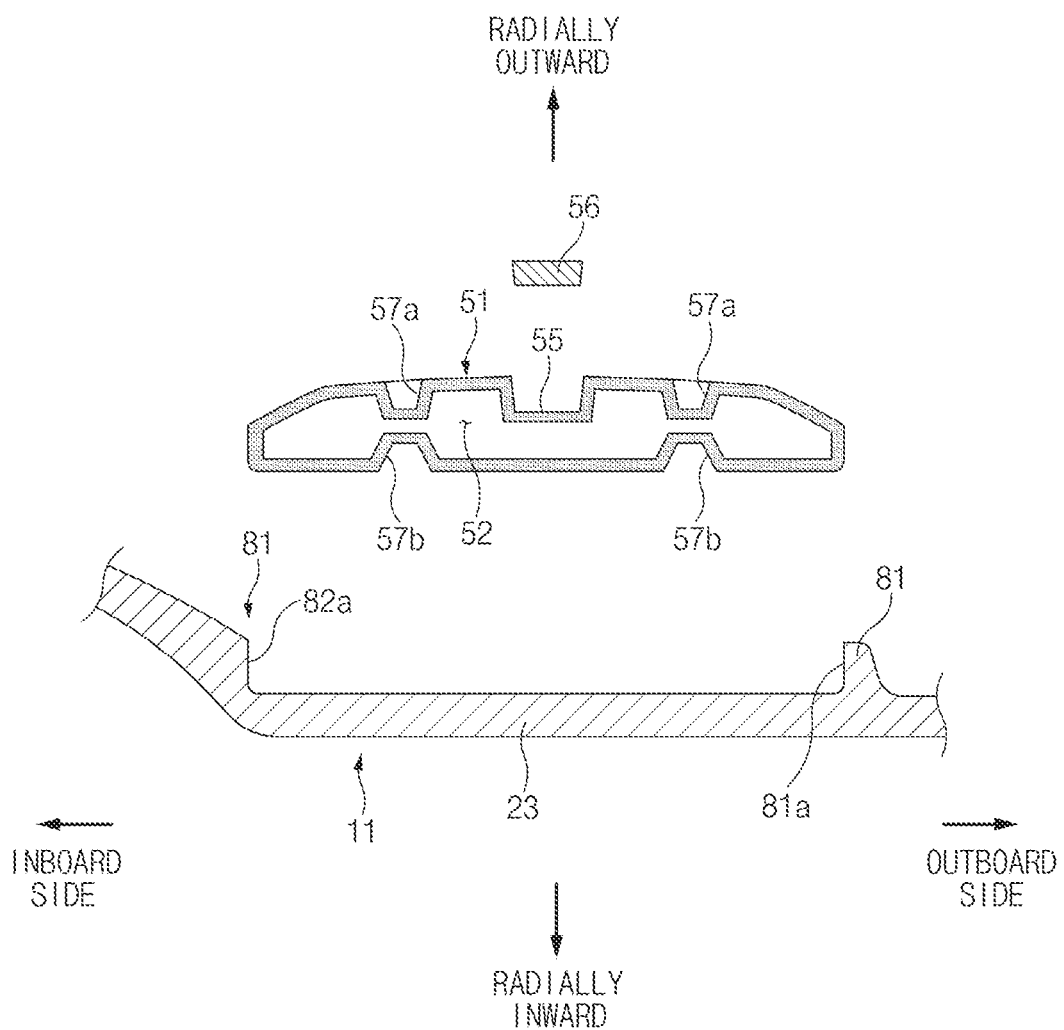
FIG. 10 is a view illustrating a state in which a resonance tube illustrated in FIG. 9 is separated from an outer peripheral surface of a rim.

FIGS. 8 to 10 are views illustrating a resonator 50 according to another exemplary embodiment of the present disclosure. Referring to FIGS. 8 to 10, the resonator 50 according to another exemplary embodiment of the present disclosure may include a plurality of resonance tubes 51 attached to the outer peripheral surface of the rim 11, and a fastening strap 56 configured to fasten the plurality of resonance tubes 51 to the outer peripheral surface of the rim 11.

Referring to FIG. 8, the plurality of resonance tubes 51 is annularly connected by the plurality of strips 53, such that the plurality of resonance tubes 51 and the plurality of strips 53 may be continuously connected along the circumference of the rim 11. The two adjacent resonance tubes 51 are connected by each of the strips 53, such that the plurality of resonance tubes 51 and the plurality of strips 53 may be arranged alternately along the outer peripheral surface of the rim 11. Each of the strips 53 may be configured to connect the ends of the two adjacent resonance tubes 31 along the circumference of the rim 11. Like the previous exemplary embodiment, the end of the strip 53 may be integrally coupled to the end of the resonance tube 51.

Each of the resonance tubes 51 and each of the strips 53 may have a curved shape that matches a curvature of the rim 11. Therefore, each of the resonance tubes 51 and each of the strips 53 may be in tight contact with the outer peripheral surface of the rim 11. Each of the resonance tubes 51 may be a Helmholtz resonator having a vent neck 54 extending from at least one end thereof. The vent neck 54 may have a vent hole 54a that communicates with a cavity 52 of the resonance tube 51, and the cavity 52 of each of the resonance tubes 51 may communicate, through the vent hole 54a, with a cavity defined by an inner peripheral surface of a tire (not illustrated) and the outer peripheral surface of the rim 11.

Referring to FIG. 9, each of the resonance tubes 51 may have a coupling groove 55 extending along the outer peripheral wall thereof, and the coupling groove 55 may be recessed from the outer peripheral wall of the resonance tube 51 toward the inner peripheral wall of the resonance tube 51. The coupling groove 55 may extend along a center line of the outer peripheral wall of the resonance tube 51. In particular, the coupling groove 55 may be curved along a curved shape of the resonance tube 51.

According to the exemplary embodiment, the strip 53 may be aligned on the inner peripheral walls of the two adjacent resonance tubes 51, such that the strip 53 may connect the inner peripheral walls of the two adjacent resonance tubes 51. Therefore, the strip 53 may be positioned below the coupling groove 55, and an upper surface of the strip 53 may be in direct contact with the fastening strap 56.

The fastening strap 56 may extend in a circumferential direction of the resonator 60, and a strap fastener, such as a clip or a buckle, may be provided at both ends of the fastening strap 56. The fastening strap 56 may be inserted into the coupling groove 55 of the resonance tube 51 and seated on the upper surface of the strip 53. The fastening strap 56 is tightened around the plurality of resonance tubes 51 and the plurality of strips 53 by the strap fastener such as a clip or a buckle, such that the resonance tubes 51 and the strips 53 may be fixed to the outer peripheral surface of the rim 11. In particular, since the fastening strap 56 is inserted into the coupling grooves 55 of the respective resonance tubes 51, the resonance tubes 51 and the strips 53 may be more rigidly and stably fixed to the outer peripheral surface of the rim 11.

According to another exemplary embodiment, the strip 53 may have a coupling groove 53a extending between the coupling grooves 55 of the two adjacent resonance tubes 51, such that the fastening strap 56 may be inserted into the coupling groove 53a of the strip 53. The coupling groove 53a may be curved along the curved shape of the strip 53.

Each of the resonance tubes 51 may have a plurality of beads 57a and 57b formed on an outer peripheral wall and/or an inner peripheral wall thereof, and the plurality of beads 57a and 57b may be spaced apart from one another at predetermined intervals in the longitudinal direction of the resonance tube 31. The rigidity of the resonance tube 51 may be enhanced by the plurality of beads 57a and 57b, such that the cavity 52 of the resonance tube 51 may be constantly maintained. Referring to FIGS. 9 and 10, each of the plurality of first beads 57a may be a recessed bead recessed from the outer peripheral wall of the resonance tube 51 toward the inner peripheral wall of the resonance tube 51, and each of the plurality of second beads 57b may be a recessed bead recessed from the inner peripheral wall of the resonance tube 51 toward the outer peripheral wall of the resonance tube 51.

The resonance tube 51 may have a first contact surface 58 extending along a first edge of the resonance tube 51, and a second contact surface 59 extending along a second edge of the resonance tube 51. The first edge of the resonance tube 51 may be an edge directed toward the outboard side of the vehicle, and the second edge of the resonance tube 51 may be an edge directed toward the inboard side of the vehicle. The rim 11 may have a first stopper 81 configured to support the first contact surface 58 of the resonance tube 51, and a second stopper 82 configured to support the second contact surface 59 of the resonance tube 51. The first stopper 81 may protrude radially outward from the well 23 of the rim 11, and the first stopper 81 may be positioned on a middle portion of the well 23. The first stopper 81 may have a first support surface 81a configured to come into contact with the first contact surface 58. The first contact surface 58 may be a flat surface, and the first support surface 81a may be a flat surface corresponding to the first contact surface 58. Therefore, the first contact surface 58 may come into tight contact with the first support surface 81a. The second stopper 82 may protrude radially outward from an inboard edge of the well 23, and the second stopper 82 may have a second support surface 82a configured to come into contact with the second contact surface 59. The second contact surface 59 may be a flat surface, and the second support surface 82a may be a flat surface corresponding to the second contact surface 59. Therefore, the second contact surface 59 may come into tight contact with the second support surface 82a. As described above, the position at which the resonance tube 51 is mounted may be stably restricted in the well 23 of the rim 11 by the first stopper 81 and the second stopper 82.

Figure 11:
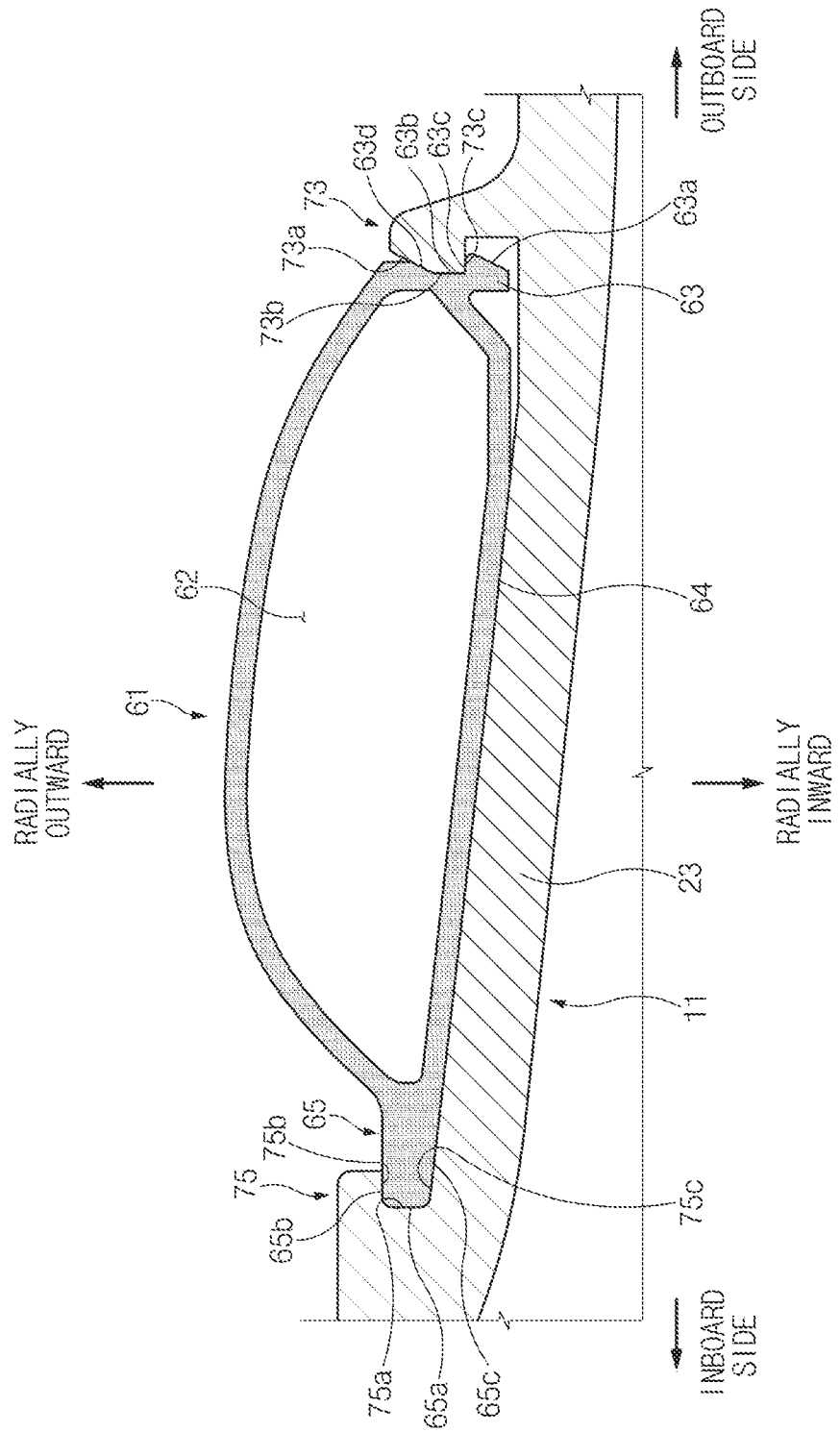
FIG. 11 is a view illustrating a structure in which a resonance tube for a vehicle wheel according to still another exemplary embodiment of the present disclosure is mounted.

FIG. 11 is a view illustrating a resonance tube 61 according to still another exemplary embodiment of the present disclosure.

Referring to FIG. 11, the resonance tube 61 according to still another exemplary embodiment of the present disclosure may include a cavity 62, a retention tab 63 extending along a first edge of the resonance tube 61, and a fitting protrusion 65 extending along a second edge of the resonance tube 61. The first edge of the resonance tube 61 may be an edge directed toward the outboard side of the vehicle, and the second edge of the resonance tube 61 may be an edge directed toward the inboard side of the vehicle. The retention tab 63 may protrude inward in a radial direction of the resonance tube 61 from the first edge of the resonance tube 61, and the fitting protrusion 65 may horizontally extend toward the inboard side of the vehicle from the second edge of the resonance tube 61.

The rim 11 may include a coupling protrusion 73 to which the retention tab 63 of the resonance tube 61 is coupled, and a coupling groove 75 to which the fitting protrusion 65 of the resonance tube 61 is coupled. The coupling protrusion 73 may protrude outward in the radial direction of the rim 11 from the outer peripheral surface of the rim 11. The coupling protrusion 73 may protrude outward in the radial direction of the rim 11 from the center of the well 23. The coupling groove 75 may be formed at the inboard edge of the well 23, such that the coupling groove 75 may be directed toward the inboard side of the vehicle.

The retention tab 63 may include a tapered surface 63a, a vertical coupling surface 63b, a horizontal coupling surface 63c, and an inclined coupling surface 63d. The horizontal coupling surface 63c may horizontally extend from the tapered surface 63a, the vertical coupling surface 63b may vertically extend from the horizontal coupling surface 63c, and the inclined coupling surface 63d may inclinedly extend from the vertical coupling surface 63b. The tapered surface 63a of the retention tab 63 may have a predetermined inclination angle to allow the retention tab 63 to be bent toward a center of the resonance tube 61 when the resonance tube 61 is assembled to the rim 11. The vertical coupling surface 63b of the retention tab 63 may be vertically flat, the horizontal coupling surface 63c of the retention tab 63 may be horizontally flat, and the inclined coupling surface 63d of the retention tab 63 may be inclined.

The coupling protrusion 73 may include a tapered surface 73a, a vertical coupling surface 73b, and a horizontal coupling surface 73c. The vertical coupling surface 73b may vertically extend from the tapered surface 73a, and the horizontal coupling surface 73c may horizontally extend from the vertical coupling surface 73b. The tapered surface 73a of the coupling protrusion 73 may have a predetermined inclination angle in order to allow the retention tab 63 to be bent toward the outside of the resonance tube 61 when the resonance tube 61 is assembled to the rim 11. The vertical coupling surface 73b of the coupling protrusion 73 may be vertically flat, and the horizontal coupling surface 73c of the coupling protrusion 73 may be horizontally flat.

The tapered surface 63a of the retention tab 63 may slide along the tapered surface 73a of the coupling protrusion 73 when the retention tab 63 of the resonance tube 61 is assembled to the coupling protrusion 73 of the rim 11. When the tapered surface 63a of the retention tab 63 is completely moved down below the tapered surface 73a of the coupling protrusion 73, the inclined coupling surface 63d of the retention tab 63 is coupled to the tapered surface 73a of the coupling protrusion 73, the vertical coupling surface 63b of the retention tab 63 is coupled to the vertical coupling surface 73b of the coupling protrusion 73, and the horizontal coupling surface 63c of the retention tab 63 is coupled to the horizontal coupling surface 73c of the coupling protrusion 73, such that the retention tab 63 may be rigidly coupled to the coupling protrusion 73.

The fitting protrusion 65 may include a vertical coupling surface 65a, an upper horizontal coupling surface 65b, and a lower horizontal coupling surface 65c. The vertical coupling surface 65a may be vertically flat, and the upper horizontal coupling surface 65b and the lower horizontal coupling surface 65c may be horizontally flat. The upper horizontal coupling surface 65b may horizontally extend from an upper end of the vertical coupling surface 65a, and the lower horizontal coupling surface 65c may horizontally extend from a lower end of the vertical coupling surface 65a.

The coupling groove 75 may include a vertical coupling surface 75a, an upper horizontal coupling surface 75b, and a lower horizontal coupling surface 75c. The vertical coupling surface 75a may be vertically flat, and the upper horizontal coupling surface 75b and the lower horizontal coupling surface 75c may be horizontally flat. The upper horizontal coupling surface 75b may horizontally extend from an upper end of the vertical coupling surface 75a, and the lower horizontal coupling surface 75c may horizontally extend from a lower end of the vertical coupling surface 75a.

During the process of assembling the fitting protrusion 65 of the resonance tube 61 to the coupling groove 75 of the rim 11, the vertical coupling surface 65a of the fitting protrusion 65 is coupled to the vertical coupling surface 75a of the coupling groove 75, the upper horizontal coupling surface 65b of the fitting protrusion 65 is coupled to the upper horizontal coupling surface 75b of the coupling groove 75, and the lower horizontal coupling surface 65c of the fitting protrusion 65 is coupled to the lower horizontal coupling surface 75c of the coupling groove 75, such that the fitting protrusion 65 may be rigidly coupled to the coupling groove 75.

As described above, the retention tab 63 of the resonance tube 61 is coupled to the coupling protrusion 73 of the rim 11 in a snap-fit manner, and the fitting protrusion 65 of the resonance tube 61 is fitted with the coupling groove 75 of the rim 11, such that the resonance tube 61 may be rigidly coupled to the outer peripheral surface of the well 23 of the rim 11.

According to the present disclosure, the resonator is rigidly mounted on the outer peripheral surface of the rim, such that it is possible to reduce vibration and noise that occur due to a flow of air in the tire while the vehicle travels.

According to the present disclosure, the fitting groove of the resonance tube is coupled to the fitting protrusion of the rim, and the first and second contact protrusions of the resonance tube overlap and come into contact with the outer peripheral surface of the rim, such that it is possible to prevent the resonance tube and the rim from being separated from each other or prevent a gap from being formed between the resonance tube and the rim, thereby minimizing the occurrence of vibration.

According to the present disclosure, the position at which the resonance tube is mounted may be stably restricted in the well of the rim, such that it is possible to assuredly prevent the resonance tube from being damaged by the tire assembling jig when the tire is assembled to the rim.

The above description is simply given for illustratively describing the technical spirit of the present disclosure, and those skilled in the art to which the present disclosure pertains will appreciate that various changes and modifications are possible without departing from the essential characteristic of the present disclosure.

Therefore, the exemplary embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical spirit in the equivalent scope thereto should be construed as falling within the scope of the present disclosure.

What is claimed is:

1. A wheel structure of a vehicle, the wheel structure comprising:
   a rim; and
   a resonator comprising a plurality of resonance tubes attached along an outer peripheral surface of the rim,
   wherein the plurality of resonance tubes is spaced apart from each other and connected along the outer peripheral surface of the rim by a plurality of strips,
   wherein an end of each of the strips is coupled to a corresponding end of each of the resonance tubes,
   wherein each of the strips has an embedded protrusion protruding toward a corresponding resonance tube from the end of the strip, and a head portion at one end of the embedded protrusion in a protruding direction,
   wherein each resonance tube has an encapsulation wall configured to surround the embedded protrusion, and the encapsulation wall has a hole through which the embedded protrusion extends, and wherein the head portion is disposed in a cavity of each resonance tube.

2. The wheel structure of claim 1, wherein the hole has a cylindrical shape having an inner surface and an inner diameter that correspond to an outer surface and an outer diameter, respectively, of the embedded protrusion.

3. The wheel structure of claim 1 wherein a bottom surface of the head portion has a diameter larger than a diameter of the embedded protrusion.

4. The wheel structure of claim 1, wherein each resonance tube is connected with the outer peripheral surface of the rim in a snap-fitted manner.

5. The wheel structure of claim 4, wherein each resonance tube has a fitting groove extending along an inner peripheral wall of each resonance tube, and wherein the rim has a fitting protrusion disposed in the fitting groove.

6. The wheel structure of claim 5, wherein the fitting groove has a shape of being recessed from the inner peripheral wall of each resonance tube toward an outer peripheral wall of each resonance tube.

7. The wheel structure of claim 6, wherein each resonance tube comprises a cavity well which is configured to separate the fitting groove from a cavity of each resonance tube, and the cavity well extends inwards to be recessed from the inner peripheral wall of each resonance tube toward the outer peripheral wall of each resonance tube.

8. The wheel structure of claim 7, wherein each resonance tube comprises first and second retention lips facing the fitting groove, and the first and second retention lips face each other based on a center of the fitting groove, wherein the fitting protrusion comprises an extension rib protruding radially outward from the outer peripheral surface of the rim, and first and second retention protrusions extending from the extension rib to be opposite to each other, and wherein the first retention protrusion is configured to be coupled to the first retention lip, and the second retention protrusion is configured to be coupled to the second retention lip.

9. The wheel structure of claim 4, wherein each resonance tube comprises first and second contact protrusions configured to overlap and come into contact with the outer peripheral surface of the rim, and wherein the first contact protrusion is spaced apart from the second contact protrusion in a width direction of each resonance tube.

10. The wheel structure of claim 9, wherein the rim comprises:

a first stopper configured to support the first contact protrusion; and a second stopper configured to support the second contact protrusion.

11. The wheel structure of claim 4, wherein each resonance tube comprises:

a retention tab extending along a first edge; and a fitting protrusion extending along a second edge, wherein the first edge is an edge directed toward an outboard side of the vehicle, and the second edge is an edge directed toward an inboard side of the vehicle, and wherein the rim comprises:

a coupling protrusion to which the retention tab is coupled; and a coupling groove to which the fitting protrusion is coupled.

12. The wheel structure of claim 11, wherein the retention tab extends radially inward from the first edge of each resonance tube, and wherein the coupling protrusion extends radially outward from the outer peripheral surface of the rim.

13. The wheel structure of claim 11, wherein the fitting protrusion horizontally extends from the second edge of each resonance tube toward the inboard side of the vehicle.

14. The wheel structure of claim 1, wherein the plurality of resonance tubes is configured to be attached to the outer peripheral surface of the rim by a fastening strap, and the fastening strap is tightened around the plurality of resonance tubes and the plurality of strips by a strap fastener, such that the plurality of resonance tubes and the plurality of strips are fixed to the outer peripheral surface of the rim.

15. The wheel structure of claim 14, wherein each resonance tube has a coupling groove extending along an outer peripheral wall thereof, wherein the coupling groove is configured to be recessed from the outer peripheral wall of each resonance tube toward an inner peripheral wall of the resonance tube, and wherein the fastening strap is disposed in the coupling groove of each resonance tube.

* * * * *